US012185692B2

(12) United States Patent
Kim et al.

(10) Patent No.: US 12,185,692 B2
(45) Date of Patent: Jan. 7, 2025

(54) SCOOP-TYPE CAT TOILET (71) Applicant: VALIANTX CO., LTD., Bucheon-si (KR)

(72) Inventors: Taehyun Kim, Seoul (KR); Doosan Baek, Seoul (KR); Susang Park, Uiwang-si (KR)

(73) Assignee: VALIANTX CO., LTD., Bucheon-si (KR)

( * ) Notice: Subject to any disclaimer, the term of this patent is extended or adjusted under 35 U.S.C. 154(b) by 57 days.

(21) Appl. No.: 18/052,154

(22) Filed: Nov. 2, 2022

(65) Prior Publication Data

US 2023/0371465 A1 Nov. 23, 2023

Related U.S. Application Data (63) Continuation of application No. PCT/KR2022/009176, filed on Jun. 28, 2022.

(30) Foreign Application Priority Data

May 17, 2022 (KR) ......................... 10-2022-0060041

(51) Int. Cl.
*A01K 1/01* (2006.01)
(52) U.S. Cl.
CPC .................. *A01K 1/011* (2013.01)
(58) Field of Classification Search
CPC .... A01K 1/011; A01K 1/0117; A01K 1/0135; A01K 1/0139
See application file for complete search history.

(56) References Cited

U.S. PATENT DOCUMENTS

| | | | | |
|---|---|---|---|---|
| 5,226,388 A | * | 7/1993 | McDaniel | A01K 1/0114 119/166 |
| 5,544,620 A | * | 8/1996 | Sarkissian | A01K 1/0114 119/166 |
| 6,082,302 A | * | 7/2000 | Thaler | A01K 1/0114 119/161 |
| 6,205,954 B1 | * | 3/2001 | Bogaerts | A01K 1/0114 119/166 |
| 9,504,230 B1 | * | 11/2016 | Schillero, Jr. | A01K 1/0236 |
| 2007/0056521 A1 | * | 3/2007 | Caputa | A01K 1/011 119/166 |

(Continued)

FOREIGN PATENT DOCUMENTS

| | | | |
|---|---|---|---|
| CN | 107711529 A | * | 2/2018 |
| CN | 110089440 A | * | 8/2019 ............ A01K 1/011 |

(Continued)

*Primary Examiner* — Tien Q Dinh
*Assistant Examiner* — Katelyn T Truong
(74) *Attorney, Agent, or Firm* — Studebaker & Brackett PC (57) ABSTRACT The present disclosure relates to a scoop-type cat toilet. The scoop-type cat toilet includes a housing having at least one opening through which a cat enters or exits an internal space of the housing, an excrement box having excrement sand, rails provided on inner surfaces of two opposite lateral surfaces of the housing, a collection part including gear boxes having gears configured to move along the rails, and a scooper connected to the gear boxes and configured to scoop and move excrement mixed with the excrement sand, and a collection box configured to accommodate the excrement moved by the collection part.

12 Claims, 7 Drawing Sheets

(56) References Cited

U.S. PATENT DOCUMENTS

2022/0210998 A1\* 7/2022 Cook .................. A01K 1/0157

FOREIGN PATENT DOCUMENTS

| CN | 113728931 A | \* | 12/2021 | |
|---|---|---|---|---|
| KR | 20120022223 A | \* | 3/2012 | |
| KR | 20210002137 U | \* | 9/2021 | |
| NL | 2031528 B1 | \* | 4/2022 | |
| WO | WO-2013192498 A1 | \* | 12/2013 | ............. A01K 1/011 |

\* cited by examiner

SCOOP-TYPE CAT TOILET

CROSS-REFERENCE TO RELATED APPLICATIONS

The present application is a continuation of International Patent Application No. PCT/KR2022/009176, filed on Jun. 28, 2022, which is based upon and claims the benefit of priority to Korean Patent Application No. 10-2022-0060041, filed on May 17, 2022. The disclosures of the above-listed applications are hereby incorporated by reference herein in their entirety.

TECHNICAL FIELD

The present invention relates to a scoop-type cat toilet, and more particularly, to a scoop-type cat toilet, in which an internal space in which a cat can defecate, and when excrement occurs, a scooper may scoop the excrement while moving along a rail and discharge the excrement to a collection box.

BACKGROUND ART

In general, a cat has a habit of digging sand, defecating, and then covering the excrement with sand. Therefore, most people who have cats at home install so-called cat toilets in which sand is loaded in a container with an open upper side.

Most of the cat's excrement accumulated in the cat toilet is removed by using a tool such as a shovel to dig up the excrement and sand together and using a mesh body as a separate object to filter out the excrement. Alternatively, the user uses a shovel equipped with a mesh body through which the sand passes, and removes the excrement remaining after filtering out the excrement.

This process requires a large amount of work time and causes inconvenience to the user in that he/she needs to manually find the excrement one by one. In addition, the cat's excrement causes a terrible smell over time, and it is very unpleasant when the user removes the excrement directly.

In addition, in the process of finding the excrement, various hygiene problems may occur because the user's hand may come into contact with the sand contaminated by the excrement, the sand and dust can be blown into the air, and the bacteria can penetrate through the respiratory tract.

Related Technical Document (Patent Document 1): Korean Patent Application Laid-Open No. 10-2021-0142426 (published on Nov. 25, 2021)

Technical Problem

The present invention has been made in an effort to solve the above-mentioned technical problems, and an object of the present invention is to provide a scoop-type cat toilet, in which an internal space in which a cat can defecate, and when excrement occurs, a scooper may scoop the excrement while moving along a rail and discharge the excrement to a collection box.

Technical Solution

To achieve the above-mentioned object, the present invention provides a scoop-type cat toilet including: a housing having an internal space and at least one opening through which a pet enters or exits the internal space; an excrement box provided below the internal space and having excrement sand loaded therein; rails provided on inner surfaces of two opposite lateral surfaces of the housing that face each other; a collection part including gear units configured to move along the rails, and a scooper connected to the gear units and configured to scoop and move excrement mixed with the excrement sand in the excrement box; and a collection box configured to accommodate the excrement moved by the collection part.

In this case, the rail may include: a first straight portion configured to define a length from a front side to a rear side of the internal space; a first curvature portion extending from the first straight portion and configured to define a first curvature upward in the internal space; a second straight portion extending from the first curvature portion; and a second curvature portion extending from the second straight portion and configured to define a second curvature rearward in the internal space.

In addition, the first curvature may be smaller than the second curvature.

In addition, the housing and the excrement box may further include expanded portions having sliding expandable multilayered structures. In addition, the cat toilet may further include additional rails coupled to inner surfaces of expanded portions of two opposite lateral surfaces of the housing when the housing and the excrement box are sliding expanded, the additional rails each having one end fitted and coupled to the corresponding rail so as to extend from the corresponding rail.

In addition, the rail may include: an upper end divided into a first lane and a second lane in a longitudinal direction; and a lower end formed as a rack gear.

In addition, the gear unit may include: first and second rollers spaced apart from each other, the first roller being configured to move along the first lane, and the second roller being configured to move along the second lane; a pinion gear configured to engage with the rack gear; and a gear box coupled to the first roller, the second roller, and the pinion gear by means of bearings.

In addition, the rail may further include an extension lane including a stator coil therein.

The gear box may have a depressed portion into which the extension lane is inserted to be spaced apart from the depressed portion, and the gear box may further include magnets provided upper and lower portions of the depressed portion facing the stator coil.

In this case, the pinion gear may move along the rail in a magnetic induction manner.

In addition, the rail may further include: a first curved depressed portion formed in the first curvature portion of the first lane; and a second curved depressed portion formed in the first curvature portion of the second lane, in which the first curved depressed portion and the second curved depressed portion are formed at different positions of a first circle of curvature and guide the corresponding roller so that the corresponding roller moves along the first circle of curvature according to an inner curvature of the rack gear on the first curvature portion.

In this case, the first roller and the second roller may move on the corresponding curved depressed portion at the same point in time.

In addition, a distance between centers of the first and second rollers may be smaller than a diameter of the first circle of curvature, and a distance between the center of the first roller and a center of the first circle of curvature may be equal to a distance between the center of the second roller and a center of the first circle of curvature.

In addition, an inner curvature of the excrement box may be defined as a value larger by a preset value than an inner curvature of a third circle of curvature or an inner curvature of the third circle of curvature when a center of the first circle of curvature according to the inner curvature of the rack gear, a center of the second circle of curvature according to the outer curvature of the rack gear, and a center of the third circle of curvature according to a curvature corresponding to a movement route of a rake portion provided on a scooper are formed based on the single same center point.

In addition, the pinion gear configured to move via the first curvature portion may accelerate in operating speed in comparison with the first roller and the second roller. The pinion gear may be coupled to the gear box by means of a bearing, and the gear unit may further include a spring damper configured to elastically support the bearing from the gear box.

In addition, the scooper may include: a body configured to define a length in a direction from a first lateral surface to a second lateral surface of the housing and having two opposite ends coupled to the gear units at two opposite sides; a rake portion having a scoop-type rake formed downward from the body; and a cover open bar configured to define a predetermined length defined toward a rear side of the housing from two opposite ends above the rake portion.

In addition, the collection box may include: an upper end disposed rearward of the internal space and fixedly coupled to the two opposite lateral surfaces of the housing; and a collection container provided below the upper end and configured to be detachable, the upper end and the collection container may define a closed space that accommodates excrement, a cover may be hingedly coupled to the upper end, and the cover may open or close the collection box by using a cover open bar that moves as the gear unit moves. Other detailed matters of the embodiment are included in the detailed description and the drawings.

Advantageous Effects

Therefore, according to the present invention, it is possible to provide the scoop-type cat toilet, in which the internal space in which the cat can defecate, and when excrement occurs, the scooper may scoop the excrement while moving along the rail and discharge the excrement to the collection box. Therefore, the user does not directly perform the excrement treatment process, but may only remove the excrement collected in the collection box. Therefore, the cat toilet is easy to use, and hygienic cleanliness may be maintained.

In addition, the scooping structure may separate the excrement and the sand, and then only the excrement may be discharged to the collection box separated from the internal space. The cover may be provided on the separated collection box and opened only when the excrement collecting operation is performed, thereby suppressing the smell of the excrement.

In addition, the excrement box and the collection container are detachably provided, which makes it easy to replace the sand in the excrement box and treat the excrement in the collection container. A bag may be inserted into the collection container and replaced and used, which makes it easier to treat the excrement.

The effects according to the present invention are not limited to the above-mentioned effects, and more various effects are included in the present specification.

DETAILED DESCRIPTION

The following contents merely illustrate the principle of the present invention. Therefore, those skilled in the art can implement the principles of invention and invent various devices included in the concept and scope of the invention even though the principles are not clearly explained or shown in the present specification. In addition, all the conditional terms and embodiments listed herein need to be understood as clearly intended only for the purpose of understanding the concept of the invention, and not limited to the specially listed embodiments and conditions.

In addition, in the following descriptions, the ordinal numbers such as "first," and "second" are intended to explain the equivalent and independent objects, and it should be understood that there is no meaning related to the order of main/sub or master/slave.

The above-mentioned objects, features, and advantages will be more apparent from the following detailed description described with reference to the accompanying drawings, and thus the technical spirit of the present invention will be easily carried out by those skilled in the art to which the present invention pertains.

Respective features of several exemplary embodiments of the present invention may be partially or entirely coupled to or combined with each other, and as sufficiently appreciated by those skilled in the art, various technical cooperation and operations may be made, and the respective exemplary embodiments may be carried out independently of each other or carried out together correlatively.

The present invention relates to a scoop-type cat toilet capable of scooping and collecting excrement. A structure and operation of the scoop-type cat toilet may be described with reference to FIGS. 1 to 9.

Figure 1:
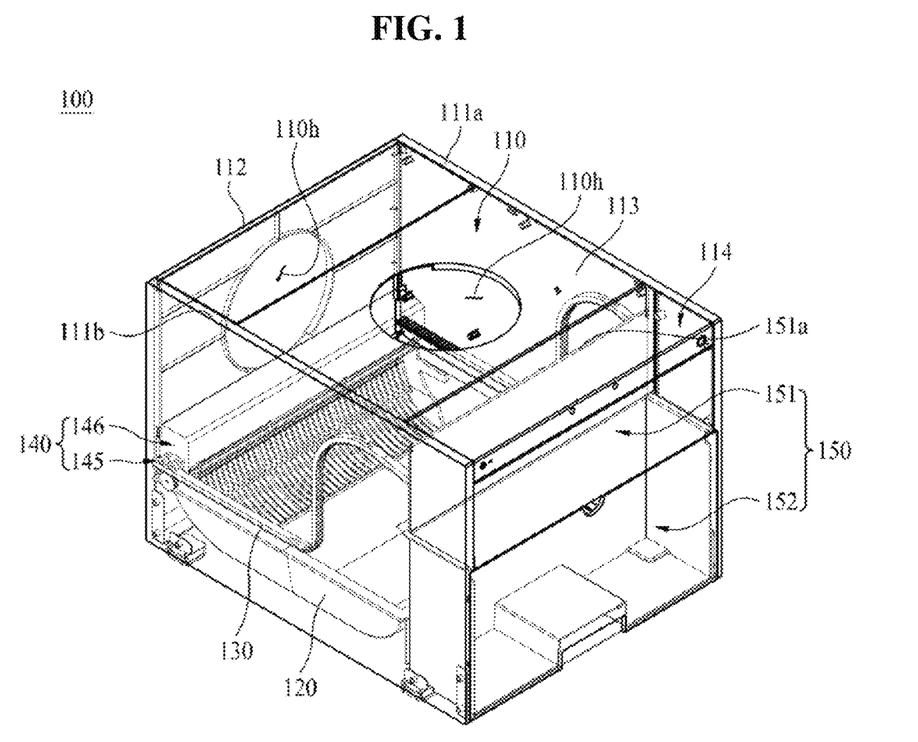
FIG. 1 is a perspective view illustrating a cat toilet according to an embodiment of the present invention.
Figure 2A:
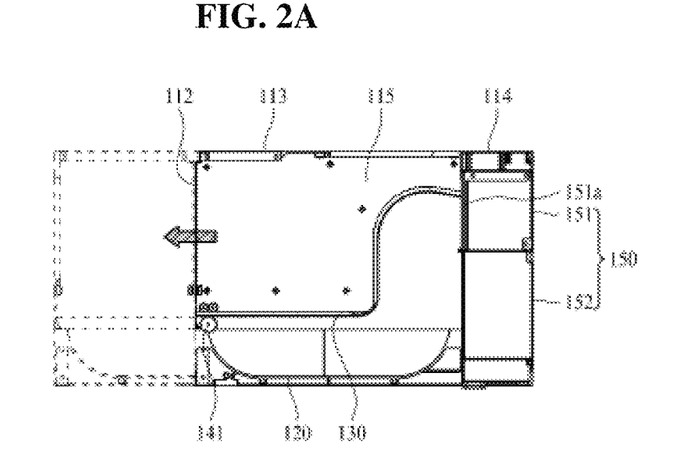
FIGS. 2A and 2B are views for explaining a sliding expansion structure of the cat toilet in FIG. 1.
Figure 2B:
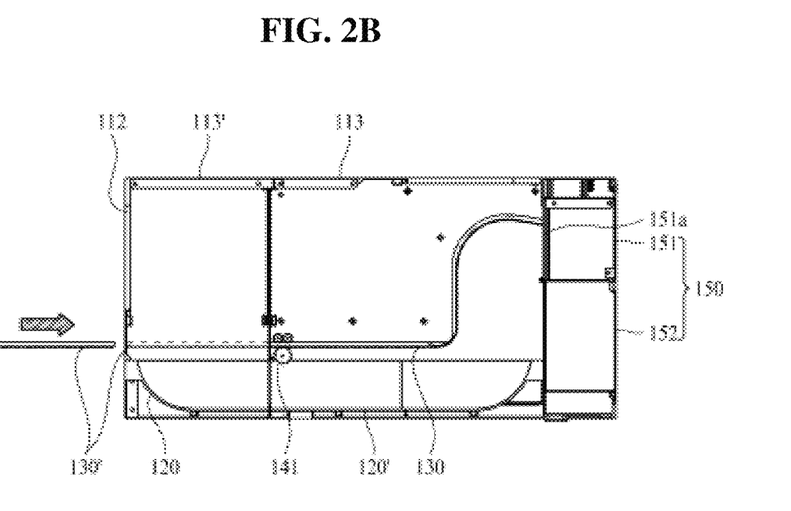
Figure 3:
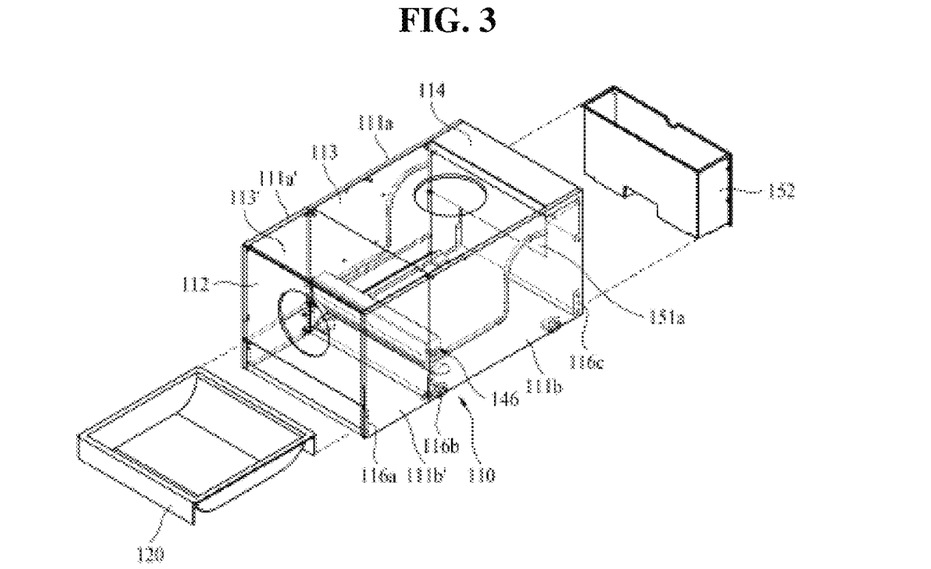
FIG. 3 is a view for explaining a process of attaching or detaching an excrement box and a collection container in FIG. 1.

FIG. 1 is a perspective view illustrating a cat toilet according to an embodiment of the present invention. FIGS. 2A and 2B are views for explaining a sliding expansion structure of the cat toilet in FIG. 1. FIG. 3 is a view for explaining a process of attaching or detaching an excrement box and a collection container in FIG. 1.

Referring to FIGS. 1 to 3, a cat toilet 100 according to an embodiment of the present invention may include a housing 110, an excrement box 120, rails 130, a collection part 140 including gear units 145 and a scooper 146, and a collection box 150.

The housing 110 may include a first lateral surface 111a, a second lateral surface 111b, a front surface 112, and an upper surface 113 and have an internal space that the cat may enter. In this case, the housing 110 may further include a lower surface (not illustrated). The excrement box 120 may be disposed in a lower space of the housing 110 without the lower surface.

That is, in the embodiment illustrated in FIG. 1, the internal space may be defined by the housing 110, the excrement box 120 disposed in the lower space of the housing 110, and the collection box 150 disposed in a rear space of the housing 110. In this case, the housing 110 may be made of a transparent plastic through which the interior of the housing 110 is visible. The housing 110 may have at least one opening portion 110h through which the cat enters or exits the housing 110.

The excrement box 120 may be provided at a lower side of the internal space, and excrement sand 11 (see FIG. 9) may be loaded into the excrement box 120. The cat entering the internal space through the opening portion 110h may defecate in the excrement box 120.

The housing 110 and the excrement box 120 may further include a multilayered sliding structure including housing expanded portions 111a', 111b', and 113' and an excrement box expanded portion 120'. When the cat grows and increases in body size, the internal space may be increased by sliding and expanding the housing 110 and the expanded portion of the excrement box 120.

The housing expanded portions may include a first lateral expanded portion 111a', a second lateral expanded portion 111b', and an upper expanded portion 113'. The housing expanded portions are additionally provided inside or outside the housing 110 and structured to be expanded or contracted by sliding. When the housing expanded portions are expanded or contracted, the housing 110 and the expanded portions need to fix the sliding structure.

In addition, the excrement box 120 may also have an overlapping excrement box expanded portion 120' having a sliding structure that is expanded or contracted.

In this case, the rail 130 needs to be extended when the housing 110 and the excrement box 120 are expanded. In the present invention, the rail 130 may be extended by inserting an additional rail 130' into the expanded space. In this case, the inserted additional rails 130' may be coupled to the rails 130 installed on the lateral surfaces 111a and 111b of the housing 110 by mutual fitting or the like.

Alternatively, instead of the sliding expansion, an expanded structure may be formed by additionally coupling expanded portions of the housing and the excrement box by using fitting coupling, screw coupling, and the like.

The rails 130 may be respectively provided on the inner surfaces of the two opposite lateral surfaces 111a and 111b of the housing 110 that face each other. The rails 130 may guide a movement route so that the scooper 146 may scoop and move the cat's excrement placed in the excrement box 120. To guide the scooping movement route, the cat toilet according to the present invention may include a structure of the rail 130 illustrated in FIG. 4, and a specific structure thereof will be described with reference to FIG. 4.

The collection part 140 may include: the gear units 145 configured to move along the rails 130 respectively provided on the first lateral surface 111a and the second lateral surface 111b; and the scooper 146 connected to the gear units 145 and configured to scoop and move the excrement mixed with the excrement sand in the excrement box 12.

The gear units 145 may include a first gear unit coupled to the rail 130 provided on the first lateral surface 111a, and a second gear unit coupled to the rail 130 provided on the first lateral surface 111a. Gear boxes 143 of the two gear units 145 may be respectively coupled to the two opposite ends of a body 1461 of the scooper 146.

In addition, the housing 110 may further include a frame 115 disposed between the gear box 143 and the body 1461 of the scooper 146 and provided in a space that does not hinder the movement of the scooper 146 in order to protect the rail 130 and the gear unit 145, i.e., to prevent the cat from approaching the rail 130 and the gear unit 145 in the internal space. The frame 115 may also have a structure that is expanded by the sliding expansion.

Figure 9:
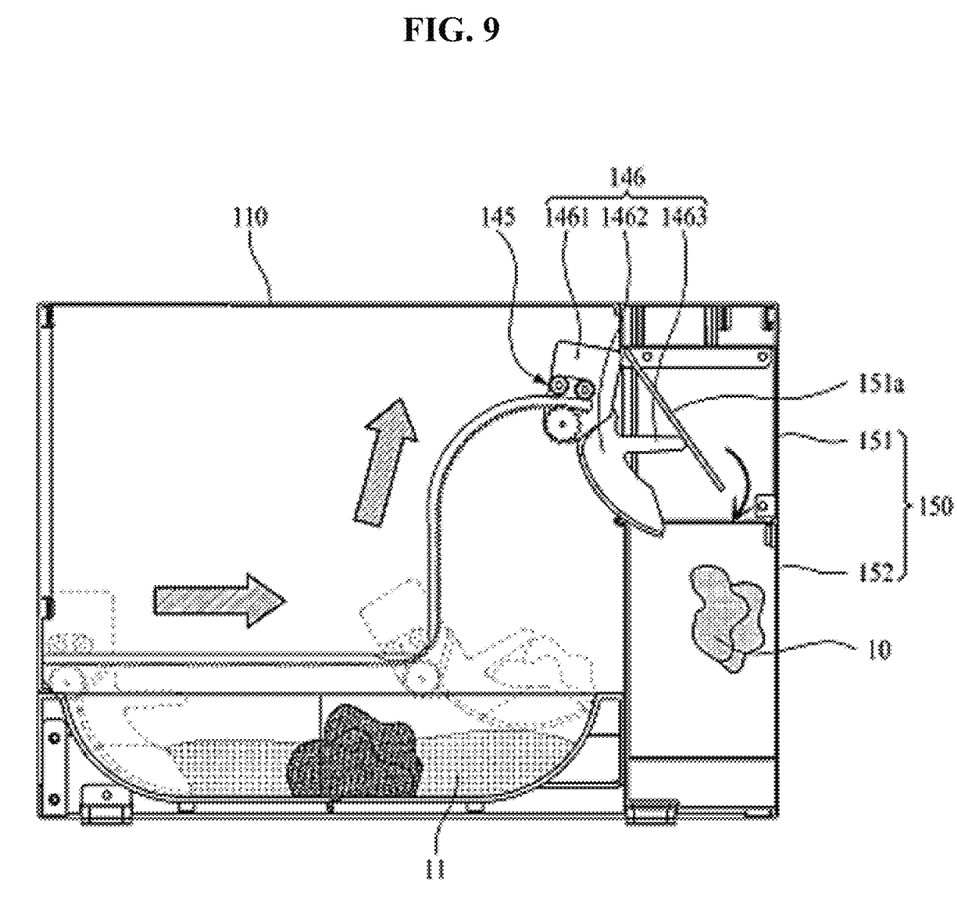
FIG. 9 is an operational view for explaining an operation of collecting excrement in the cat toilet in FIG. 1.

Referring to FIGS. 1, 3, and 9, the scooper 146 may include: the body 1461 configured to define a length in a direction from the first lateral surface 111a to the second lateral surface 111b and having two opposite ends coupled to the gear boxes 143 at two opposite sides by screw coupling 1461a (FIG. 5) and the like; a rake portion 1462 having a scoop-type rake formed downward from the body 1461; and a cover open bar 1463 configured to define a predetermined length defined toward a rear side of the housing 110 from two opposite ends above the rake portion 1462.

The collection box 150 may include: an upper end 151 fixedly coupled to the first lateral surface 111a and the second lateral surface 111b; and a collection container 152 detachably provided at a lower end of the upper end 151.

The upper end 151 and the collection container 152 may define a closed space that accommodates the excrement. In this case, when a cover 151a is hingedly coupled to the upper end 151 and an operation of collecting excrement is not performed, the cover 151a may close the collection box 150. When the operation of collecting excrement is performed, the cover open bar 1463 of the scooper 146 may open the cover 151a. In addition, the collection container 152 has a bag fixing portion (not illustrated) such as a clip, a catching projection, or the like that may accommodate and fix the collection bag therein. When the excrement is collected in the collection bag, the excrement may be removed by replacing only the collection bag.

In addition, the excrement box 120 and the collection container 152 of the scoop-type cat toilet 100 according to the present invention may be detachable in order to replace the excrement sand and discharge the excrement. The scoop-type cat toilet 100 may have supporting/fixing portions 116a, 116b, and 116c disposed below the housing 110 in order to support and fix the excrement box 120 and the collection container 152 when the excrement box 120 and the collection container 152 are mounted.

In addition, a power source unit (not illustrated) may be provided in a space 114 provided above the collection box 150. The power source unit may be provided as a replaceable battery, a rechargeable battery, or the like.

The scoop-type cat toilet 100 according to the present invention may use a rack pinion structure between the rail 13 and the gear 142 to guide the movement of the scooper. In the present invention, the rail structure illustrated in FIG. 4 may guide the scooping operation.

Figure 4:
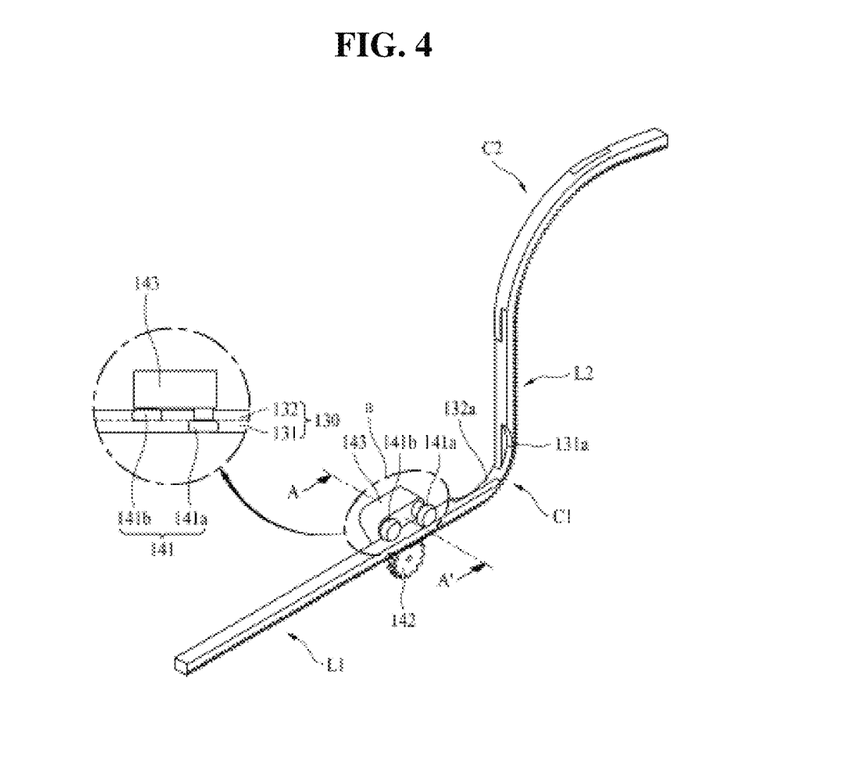
FIG. 4 is a view for explaining a rail structure in FIG. 1.
Figure 5:
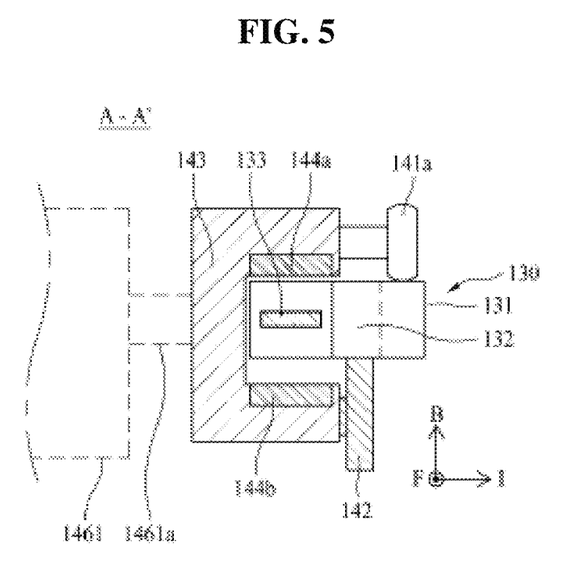
FIG. 5 is a cross-sectional view illustrating a cross-section taken along line A-A' in FIG. 4.

FIG. 4 is a view for explaining a rail structure in FIG. 1. FIG. 5 is a cross-sectional view illustrating a cross-section taken along line A-A' in FIG. 4.

Referring to FIGS. 4 and 5, the rail 130 according to the embodiment of the present invention may include a first straight portion L1 configured to define a length from the front side to the rear side of the internal space of the housing 110, a first curvature portion C1 extending from the first straight portion L1 and configured to define a first curvature upward in the internal space, a second straight portion L2 extending from the first curvature portion C1, and a second curvature portion L2 extending from the second straight portion L2 and configured to define a second curvature rearward in the internal space. In this case, the second curvature portion L2 may extend to the lateral surfaces 111a and 111b corresponding to a height of an upper end of the cover 151a.

In addition, the first curvature of the first curvature portion C1 may be smaller than a curvature of a second curvature portion C2. In addition, referring to a partially expanded view of part a of the rail 130 in FIG. 4, an upper end of the rail 130 may be divided into a first lane 131 and a second lane 132, and a lower end of the rail 130 may be formed as a rack gear 133 (FIG. 7) having teeth.

The gear unit 145 coupled to the rail 130 includes a first roller 141a, a second roller 141b, the gear 142, and the gear box 143. The first roller 141a may move via the first lane 131, and the second roller 141b may move via the second lane 132. That is, the first roller 141a and the second roller 141b may have different lengths that define a level difference. The first roller 141a and the second roller 141b may be connected to the gear box 143 through bearings. In this case, the first roller 141a and the second roller 141b may have the same diameter and be placed on the rail 130 by gravity.

The gear 142 may be provided as a pinion gear and connected to the gear box 143 through a bearing so that the gear 142 may engage with the rack gear 133 at the lower end of the rail 130 and rotate. Referring to FIG. 5, the gear 142 may move via the lower end of the rail 130 corresponding to the second lane 132.

In this case, the rail 130 and the gear unit 145 may constitute a linear motor and operate in a magnetic induction manner. Referring to FIG. 5, the rail 130 may further include an extension lane 134 including a stator coil 134' therein. The gear box 143 has a depressed portion 143' in which the extension lane 134 is inserted to be spaced apart from the depressed portion 143'. Magnet parts 144a and 144b may be provided at positions corresponding to the stator coil 134' of the rail 130, and magnets having different polarities may be disposed. For example, the first magnet part 144a may have an S-pole, and the second magnet part 144b may have an N-pole.

The stator coil 134' becomes an electromagnet when the current flows through the stator coil 134'. The electromagnet, together with the magnets 144a and 144b, provides an attractive force or a repulsive force, such that the gear unit 145 may move in a direction of an electromagnetic force. Therefore, it is possible to adjust intensity of the force F (i.e., a movement speed of the gear unit 145) and a direction of the force F (an excrement collecting direction or an original position returning direction) by adjusting a direction and intensity of the current flowing through the stator coil 134'.

The electromagnetic force is applied in a direction perpendicular to the direction of the magnetic field and the direction of the current. Therefore, when the current applied to the stationary coil 134' from a power source unit (not illustrated), the directions of the current I, the magnetic field B, and the force F may be determined, and the gear unit 145 may move along the rail 130 in the direction of the force F.

Alternatively, a general motor may be provided in the scooper body 1461 without a configuration of the rail extension portion 134, and a pinion gear may be connected to the motor and operated.

In addition, in the present invention, curved depressed portions 131a and 132a may be formed at the first curvature portion C1, at which the motion direction of the gear unit 145 is changed, so that the gear unit 145 may smoothly move along the rail 130 at a predetermined speed.

That is, the first straight portion L1, the second straight portion L2, and the second curvature portion C2 may each have a predetermined thickness. The first curvature portion C1 may have the curved depressed portions 131a and 132a. Therefore, when the gear unit 145 may move rectilinearly on the first straight portion L1 and then move in the route in which the direction is changed to the vertical motion while the gear unit 145 passes through the first curvature portion C1, the gear unit 145 may stably move at a predetermined speed.

In this case, the first roller 141a and the second roller 141b passing through the first curvature portion C1 may move at the same speed. In contrast, the gear 142 moves along the outer curvature of the rack gear 133, such that the operating speed increases. Therefore, the gear unit 145 may stably move.

In the present invention, the positions and depths of the curved depressed portions 131a and 132a may be determined based on a circle of curvature according to the first curvature. In this case, the curved depressed portions 131a and 132a need to have a depth that does not affect the rack gear 133. The description thereof will be described with reference to FIGS. 6A, 6B and 7.

Figure 6A:
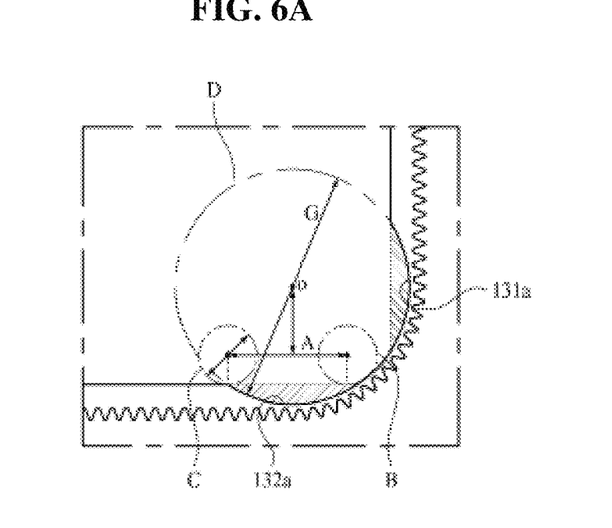
FIGS. 6A and 6B are views for explaining a first curved depressed portion and a second curved depressed portion formed in a rail in FIG. 4.
Figure 6B:
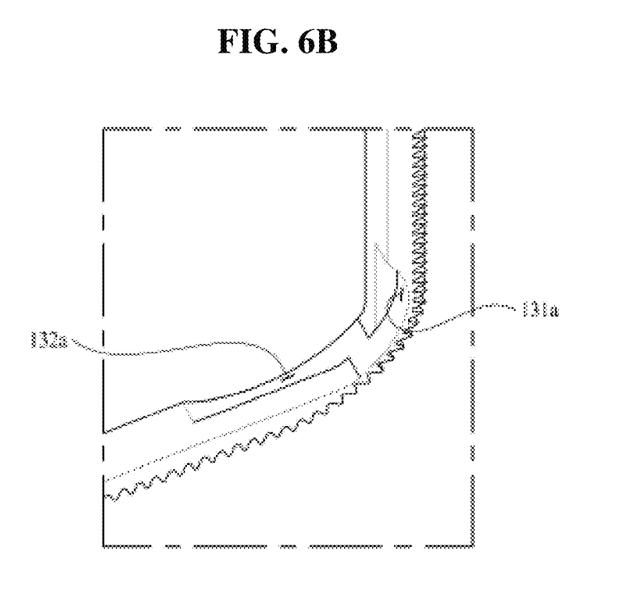
Figure 7:
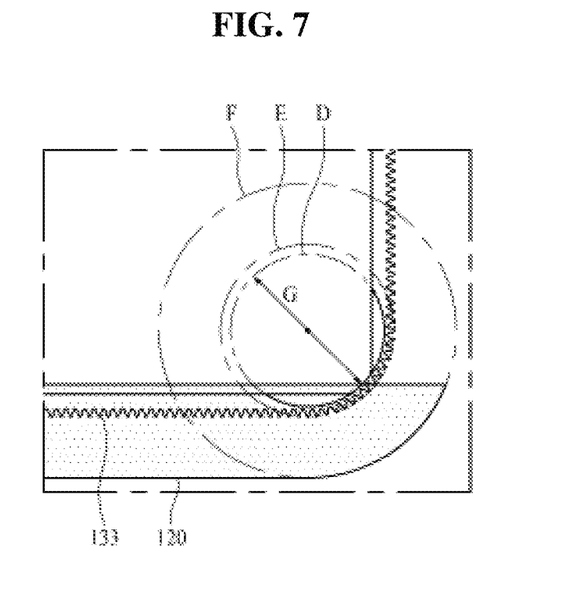
FIG. 7 is a view for explaining curvatures of an excrement box and a first curvature portion of the rail according to the embodiment of the present invention.

FIGS. 6A and 6B are views for explaining a first curved depressed portion and a second curved depressed portion formed in a rail in FIG. 4. FIG. 7 is a view for explaining the curvatures of the excrement box and the first curvature portion of the rail according to the embodiment of the present invention.

The curved depressed portions 131a and 132a need to be formed within a range in which the teeth of the rack gear 133 are maintained. Therefore, based on the teeth engaging with the pinion gear 142, the curved depressed portions 131a and 132a may be formed so that the first roller 141a and the second roller 141b move along the first circle D of curvature according to the inner curvature of the rack gear 133. That is, both a circle of curvature according to the curvature of the route in which the first roller 141a moves and a circle of curvature according to the curvature of the route in which the second roller 141b moves need to be placed on the first circle D of curvature having the same center point o.

In addition, when the first roller 141a and the second roller 141b move along the first curvature portion C1, the direction of the rectilinear motion is rapidly changed to the direction of the vertical motion. Therefore, a route in which the first roller 141a and the second roller 141b may move while maintaining a spacing distance therebetween needs to be ensured so that the first roller 141a and the second roller 141b stably move without deviating from the route. To this end, in the present invention, a dual rail divided into the first lane 131 and the second lane 132 is used as the rail 130, thereby implementing a structure in which the first roller 141a and the second roller 141b move along the different lanes 131 and 132.

For example, the lengths of the first roller 141a and the second roller 141b, which protrude from the gear box 143, may be different from each other so that the first roller 141a moves along the first lane 131, and the second roller 141b moves along the second lane 132.

Referring to FIG. 6A, the curved depressed portions are respectively formed in the first lane 131 and the second lane 132 so that the first roller 141a and the second roller 141b move along the movement route corresponding to the first circle D of curvature according to the inner curvature of the rack gear 133 according to the present invention. At a point in time at which the first roller 141a comes into contact with the first curved depressed portion 131a of the first lane 131, the second roller 141b also comes into contact with the second curved depressed portion 132a of the second lane 132, such that the positions and depths of the first curved depressed portion 131a and the second curved depressed portion 132a may be determined, as illustrated in FIG. 6B so that a route is formed, in which the rollers 141a and 141b move at the same point in time on the curved depressed portions 131a and 132a.

In addition, to define the movement route corresponding to the first circle D of curvature, a distance A between the centers of the first and second rollers 141a and 141b needs to be smaller than a diameter G of the first circle D of curvature, and a distance between the center of the first roller 141a and the center o of the first circle D of curvature may be equal to a distance between the center of the second roller 141b and the center o of the first circle D of curvature.

In addition, referring to FIG. 7, the inner curvature of the excrement box 120 may be determined based on the movement route of the end of the rake portion 1462 of the scooper 146. In this case, the circles of curvature defined by the inner curvature of the rack gear 133, the outer curvature of the rack gear 133, and the inner curvature of the excrement box 120 define the single same center point o, the scooper 146 may scoop and move the excrement.

That is, a center of the first circle D of curvature according to the inner curvature of the rack gear 133, a center of a second circle E of curvature according to an outer curvature of the rack gear 133, and a center of a third circle F of curvature according to the curvature corresponding to the movement route of the rake portion 1462 of the scooper 146 may be defined based on the single same center point o. In this case, the inner curvature of the excrement box 120 in which the rake portion 1462 moves may be formed as the inner curvature of the third circle F of curvature. Alternatively, the inner curvature of the excrement box 120 may be set to a value larger by a preset value than the inner curvature of the third circle F of curvature so that the scooper 146 may be moved by the gear unit 145 without hindrance caused by friction of the excrement box 120.

Figure 8:
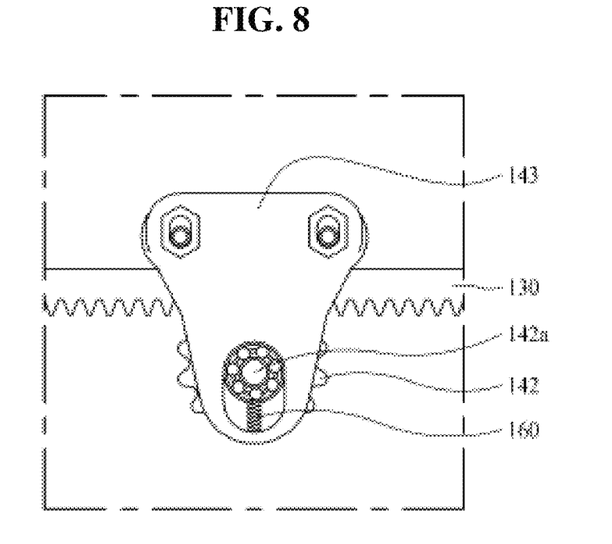
FIG. 8 is a view for explaining a spring damper of a gear box according to the embodiment of the present invention.

Alternatively, the first straight portion L1, the first curvature portion C1, the second straight portion L2, and the second curvature portion C2 of the rail 130 may have the same predetermined thickness, and a spring damper 160 may be used as a means for stably moving the gear unit 145 at a predetermined speed on the first curvature portion C1.

FIG. 8 is a view for explaining the spring damper of a gear box according to the embodiment of the present invention. Referring to FIG. 8, the pinion gear 142 may be coupled to the gear box 143 through a bearing 142a, and the gear unit 145 may further include the spring damper 160 configured to elastically support the bearing 142a from the gear box 143.

Therefore, intervals between the pinion gear 142, the first roller 141a, and the second roller 141b may increase correspondingly to the first curvature when the gear unit moves along the first curvature portion C1. Therefore, the gear unit 145 may stably move without forming the curved depressed portion.

As described above, the scoop-type cat toilet according to the present invention may move the excrement in the excrement box 120 to the collection container 152 by means of the structure illustrated in FIGS. 1 to 8. The scooping operation will be described with reference to FIG. 9.

FIG. 9 is an operational view for explaining an operation of collecting excrement in the cat toilet in FIG. 1.

The cat toilet 100 according to the present invention may have a sensor or the like disposed below the excrement box 120 and configured to measure a weight. A weight measured when sand 11 is loaded into the excrement box 120 is set to a first reference weight, a cat weight or preset weight is set to a second reference weight, and an excrement collecting operation may be performed when a weight larger than the first reference weight and smaller than the second reference weight is sensed. In addition, when the second reference weight is measured, a state in which the cat defecates may be determined, and power may be cut off.

Alternatively, a power button may be provided, the excrement collecting operation may be performed at a particular point in time under the user's operation control.

In this case, after the excrement collecting operation is completed, an operation of returning the scooper 146 to the original position may be performed.

Specifically, during the excrement collecting operation, the power source unit (not illustrated) applies the current to the stator coil 134' of the rail 130, and the gear unit 145 may move from the front side to the rear side in the internal space along the rail 130 by the magnetic induction.

When the body 1461 coupled to the gear box 143 is moved by the movement of the gear 142, the rake portion 1462 scoop and move the excrement 11 mixed with the sand 11, the cover open bar 1463 at the end of the rail 130 pushes the cover 151a upward and open the collection box 151, such that the scooped excrement 11 is dropped into the collection container 152.

In addition, during the returning operation, the direction of the current is changed, the magnetic induction occurs in the returning direction, and the cover open bar 1463 moves away from the cover 151a, such that the cover 151a may close the collection box 151, and the gear unit 145 may move to the original position. Therefore, it is possible to prevent the smell of the excrement from leaking to the outside.

Although the embodiments of the present invention have been described in detail with reference to the accompanying drawings, the present invention is not limited thereto and may be modified in many different forms without departing from the technical concept of the present invention. Therefore, the embodiments disclosed in the present invention are provided for illustrative purposes only but not intended to limit the technical spirit of the present invention. The scope of the technical spirit of the present invention is not limited thereby. Therefore, it should be understood that the above-described exemplary embodiments are illustrative in all aspects and do not limit the present invention. The protective scope of the present invention should be construed based on the following claims, and all the technical spirit in the equivalent scope thereto should be construed as falling within the scope of the present invention.

The invention claimed is:

1. A scoop-type cat toilet, comprising:
   a housing having an internal space and at least one opening through which a pet enters or exits the internal space;
   an excrement box positioned below the internal space of the housing, and containing excrement sand;
   a first rail and a second rail, which are positioned on inner surfaces of two opposite lateral surfaces of the housing that face each other;
   a collection part comprising:
      a first gear unit configured to move along the first rail;
      a second gear unit configured to move along the second rail; and
      a scooper connected with the first and second gear units, and configured to scoop and move excrement mixed with the excrement sand;
   a collection box configured to accommodate the excrement moved by the collection part,
   wherein each of the first rail and the second rail comprises:
      a first straight portion configured to define a length from a front side to a rear side of the internal space;
      a first curvature portion extending from the first straight portion and configured to define a first curvature upward in the internal space;
      a second straight portion extending from the first curvature portion; and
      a second curvature portion extending from the second straight portion and configured to define a second curvature rearward in the internal space, and
   wherein the housing and the excrement box comprise multilayered structures configured to be slidingly expanded; and
   a first additional rail and a second additional rail, which are configured to be coupled to expanded inner surfaces of the two opposite lateral surfaces of the housing when the multilayered structures of the housing and the excrement box are slidingly expanded,
   wherein the first additional rail comprises one end that is fitted and coupled to the first rail, so as to be extended from the first rail, and the second additional rail comprises one end that is fitted and coupled to the second rail, so as to be extended from the second rail.

2. The scoop-type cat toilet of claim 1, wherein the first curvature is smaller than the second curvature.

3. The scoop-type cat toilet of claim 1, wherein each of the first rail and the second rail comprises:
   an upper end divided into a first lane and a second lane in a longitudinal direction; and
   a lower end formed as a rack gear.

4. The scoop-type cat toilet of claim 3, wherein each of the first gear unit and the second gear unit comprises:
   a first roller and a second roller, which are spaced apart from each other in the longitudinal direction of a respective rail of the first rail and the second rail, the first roller being configured to move along the first lane of the respective rail of the first rail and the second rail, and the second roller being configured to move along the second lane of the respective rail of the first rail and the second rail;
   a pinion gear configured to engage with the rack gear of the respective rail of the first rail and the second rail; and
   a gear box coupled to the first roller and the second roller, and coupled to the pinion gear by means of a bearing.

5. The scoop-type cat toilet of claim 1, wherein the scooper comprises:
   a body having a length corresponding to a distance between the two opposite lateral surfaces of the housing, and having two opposite ends coupled to the first and second gear units, respectively;
   a rake portion having a shape of a scoop-type rake facing downward from the body; and
   first and second cover open bars, which are protruded toward a rear side of the housing from two opposite upper ends of the rake portion.

6. The scoop-type cat toilet of claim 5, wherein the collection box comprises:
   an upper end disposed rearward of the internal space and fixedly coupled to the two opposite lateral surfaces of the housing; and
   a collection container provided below the upper end and configured to be detachable,
   wherein the upper end and the collection container define a closed space that accommodates excrement, and a cover is hingedly coupled to the upper end, and
   wherein the cover is configured to open or close the collection box by movements of the first and second cover open bars, which are configured to be moved as the first and second gear units move.

7. A scoop-type cat toilet, comprising:
   a housing having an internal space and at least one opening through which a pet enters or exits the internal space;
   an excrement box positioned below the internal space of the housing, and containing excrement sand;
   a first rail and a second rail, which are positioned on inner surfaces of two opposite lateral surfaces of the housing that face each other;
   a collection part comprising:
      a first gear unit configured to move along the first rail;
      a second gear unit configured to move along the second rail; and
      a scooper connected with the first and second gear units, and configured to scoop and move excrement mixed with the excrement sand;
   a collection box configured to accommodate the excrement moved by the collection part,
   wherein each of the first rail and the second rail comprises:
      a first straight portion configured to define a length from a front side to a rear side of the internal space;
      a first curvature portion extending from the first straight portion and configured to define a first curvature upward in the internal space;
      a second straight portion extending from the first curvature portion; and
      a second curvature portion extending from the second straight portion and configured to define a second curvature rearward in the internal space,
   wherein each of the first rail and the second rail comprises:
      an upper end divided into a first lane and a second lane in a longitudinal direction; and
      a lower end formed as a rack gear,
   wherein each of the first gear unit and the second gear unit comprises:
      a first roller and a second roller, which are spaced apart from each other in the longitudinal direction of a respective rail of the first rail and the second rail, the first roller being configured to move along the first lane of the respective rail of the first rail and the second rail, and the second roller being configured to move along the second lane of the respective rail of the first rail and the second rail;
a pinion gear configured to engage with the rack gear of the respective rail of the first rail and the second rail; and
a gear box coupled to the first roller and the second roller, and coupled to the pinion gear by means of a bearing, wherein each of the first rail and the second rail further comprises:
an extension lane; and
a stator coil positioned inside the extension lane, wherein the gear box has a groove, and the extension lane is positioned inside the groove, wherein the gear box further comprises a first magnet positioned above the groove and a second magnet positioned below the groove, and each of the first magnet and the second magnet faces the stator coil, and wherein the pinion gear is configured to move along the extension lane by means of magnetic force that is induced by the first magnet, the second magnet, and the stator coil when the stator coil is turned into electromagnet via current.

8. A scoop-type cat toilet, comprising:
a housing having an internal space and at least one opening through which a pet enters or exits the internal space;
an excrement box positioned below the internal space of the housing, and containing excrement sand;
a first rail and a second rail, which are positioned on inner surfaces of two opposite lateral surfaces of the housing that face each other;
a collection part comprising:
a first gear unit configured to move along the first rail;
a second gear unit configured to move along the second rail; and
a scooper connected with the first and second gear units, and configured to scoop and move excrement mixed with the excrement sand;
a collection box configured to accommodate the excrement moved by the collection part, wherein each of the first rail and the second rail comprises:
a first straight portion configured to define a length from a front side to a rear side of the internal space;
a first curvature portion extending from the first straight portion and configured to define a first curvature upward in the internal space;
a second straight portion extending from the first curvature portion; and
a second curvature portion extending from the second straight portion and configured to define a second curvature rearward in the internal space, wherein each of the first rail and the second rail comprises:
an upper end divided into a first lane and a second lane in a longitudinal direction; and
a lower end formed as a rack gear, wherein each of the first gear unit and the second gear unit comprises:
a first roller and a second roller, which are spaced apart from each other in the longitudinal direction of a respective rail of the first rail and the second rail, the first roller being configured to move along the first lane of the respective rail of the first rail and the second rail, and the second roller being configured to move along the second lane of the respective rail of the first rail and the second rail;
a pinion gear configured to engage with the rack gear of the respective rail of the first rail and the second rail; and
a gear box coupled to the first roller and the second roller, and coupled to the pinion gear by means of a bearing, wherein each of the first rail and the second rail further comprises:
a first curved groove positioned in the first curvature portion of the first lane; and
a second curved groove positioned in the first curvature portion of the second lane, wherein the first curved groove and the second curved groove are formed at different positions of a first circle of curvature and guide the first roller and the second roller, so that the first roller and the second roller move along the first circle of curvature according to an inner curvature of the rack gear on the first curvature portion, and wherein the first roller and the second roller are configured to move on the first curved groove and the second curved groove, respectively, at the same point in time.

9. The scoop-type cat toilet of claim 8, wherein a distance between centers of the first and second rollers is smaller than a diameter of the first circle of curvature, and a distance between the center of the first roller and a center of the first circle of curvature is equal to a distance between the center of the second roller and a center of the first circle of curvature.

10. The scoop-type cat toilet of claim 8, wherein a curvature of the excrement box is equal to or larger than an inner curvature of a third circle of curvature according to a curvature corresponding to a movement route of a rake portion provided on the scooper, when the center point of the third circle of curvature is the same as the first circle of curvature according to the inner curvature of the rack gear and the second circle of curvature according to the outer curvature of the rack gear.

11. The scoop-type cat toilet of claim 8, wherein the pinion gear configured to move via the first curvature portion accelerates in operating speed in comparison with the first roller and the second roller.

12. A scoop-type cat toilet, comprising:
a housing having an internal space and at least one opening through which a pet enters or exits the internal space;
an excrement box positioned below the internal space of the housing, and containing excrement sand;
a first rail and a second rail, which are positioned on inner surfaces of two opposite lateral surfaces of the housing that face each other;
a collection part comprising:
a first gear unit configured to move along the first rail;
a second gear unit configured to move along the second rail; and
a scooper connected with the first and second gear units, and configured to scoop and move excrement mixed with the excrement sand;
a collection box configured to accommodate the excrement moved by the collection part, wherein each of the first rail and the second rail comprises:
a first straight portion configured to define a length from a front side to a rear side of the internal space;

a first curvature portion extending from the first straight portion and configured to define a first curvature upward in the internal space;

a second straight portion extending from the first curvature portion; and a second curvature portion extending from the second straight portion and configured to define a second curvature rearward in the internal space, wherein each of the first rail and the second rail comprises:

an upper end divided into a first lane and a second lane in a longitudinal direction; and a lower end formed as a rack gear, wherein each of the first gear unit and the second gear unit comprises:

a first roller and a second roller, which are spaced apart from each other in the longitudinal direction of a respective rail of the first rail and the second rail, the first roller being configured to move along the first lane of the respective rail of the first rail and the second rail, and the second roller being configured to move along the second lane of the respective rail of the first rail and the second rail;

a pinion gear configured to engage with the rack gear of the respective rail of the first rail and the second rail; and a gear box coupled to the first roller and the second roller, and coupled to the pinion gear by means of a bearing, wherein each of the first gear unit and the second gear unit further comprises: a spring damper configured to elastically support the bearing from the gear box.

* * * * *